(12) United States Patent
Jeong

(10) Patent No.: US 11,225,900 B2
(45) Date of Patent: Jan. 18, 2022

(54) ACTIVE AIR FLAP AND CONTROL METHOD THEREOF

(71) Applicants: HYUNDAI MOTOR COMPANY, Seoul (KR); KIA MOTORS CORPORATION, Seoul (KR)

(72) Inventor: Seong Bin Jeong, Hwaseong-si (KR)

(73) Assignees: HYUNDAI MOTOR COMPANY, Seoul (KR); KIA MOTORS CORPORATION, Seoul (KR), kr ( * ) Notice: Subject to any disclaimer, the term of this patent is extended or adjusted under 35 U.S.C. 154(b) by 307 days.

(21) Appl. No.: 16/511,587

(22) Filed: Jul. 15, 2019

(65) Prior Publication Data
US 2020/0309016 A1  Oct. 1, 2020

(51) Int. Cl.
| | | |
|---|---|---|
| *B60K 11/04* | (2006.01) | |
| *B60K 11/06* | (2006.01) | |
| *F01P 7/12* | (2006.01) | |
| *B60K 11/08* | (2006.01) | |

(52) U.S. Cl.
CPC ............... *F01P 7/12* (2013.01); *B60K 11/04* (2013.01); *B60K 11/085* (2013.01)

(58) Field of Classification Search
CPC ....... B60K 11/085; B60K 11/04; B60K 11/06; B60K 11/08
See application file for complete search history.

(56) References Cited

U.S. PATENT DOCUMENTS

| | | | | |
|---|---|---|---|---|
| 2001/0035222 A1* | 11/2001 | Cour | ..................... | F16K 15/031 137/855 |
| 2014/0090610 A1* | 4/2014 | Higuchi | ............... | B60K 11/085 123/41.58 |
| 2014/0291056 A1* | 10/2014 | Takanaga | ............. | B60K 11/085 180/274 |
| 2017/0072783 A1* | 3/2017 | Jeong | ..................... | B62D 35/00 |
| 2018/0312053 A1* | 11/2018 | Moro | ..................... | B60K 11/04 |
| 2019/0001810 A1* | 1/2019 | Fujitani | ................ | B60K 11/085 |

FOREIGN PATENT DOCUMENTS

KR         10-1655700 B1      9/2016

* cited by examiner

*Primary Examiner* — Long T Tran
(74) *Attorney, Agent, or Firm* — Morgan, Lewis & Bockius LLP

(57) ABSTRACT

An active air flap includes: a first air flap disposed between a ventilation opening of a bumper and a radiator, and openably disposed in a first section facing the radiator; a second air flap disposed between the ventilation opening of the bumper and the radiator, and openably disposed in a second section bordering the first section facing the radiator; and an air guide configured to guide air introduced into the radiator toward the first air flap and the second air flap.

13 Claims, 8 Drawing Sheets

FIG. 8

| Low cooling mode (level 1) | Closing first air flap / closing second air flap |
| Medium cooling mode (level 2) | Opening first air flap / closing second air flap |
| High cooling mode (level 3) | Opening first air flap / opening second air flap |

| A/C | Outside temperature | Refrigerant pressure | Vehicle speed | Cooling water temperature |  |  |  |  |  |  |  |
|---|---|---|---|---|---|---|---|---|---|---|---|
|  |  |  |  | 60 | 70 | 80 | 90 (Reference) | 100 | 110 | 120 (Limit) |
| On | 30°C (Reference) ≤ t | 1500kpa ≤ P | ALL | 2level | 2level | 2level | 3level | 3level | 3level | 3level |
|  |  | 1000kpa ≤ P < 1500kpa | V < 45 | 1level | 1level | 2level | 2level | 3level | 3level | 3level |
|  |  |  | 45 ≤ V < 80 | 1level | 1level | 1level | 2level | 2level | 3level | 3level |
|  |  |  | 80 ≤ V | 1level | 1level | 1level | 1level | 2level | 2level | 3level |
|  |  | 500kpa ≤ P < 1000kpa | V < 45 | 1level | 2level | 2level | 3level | 3level | 3level | 3level |
|  |  |  | 45 ≤ V < 80 | 1level | 1level | 2level | 2level | 3level | 3level | 3level |
|  |  |  | 80 ≤ V | 1level | 1level | 1level | 2level | 2level | 3level | 3level |
|  |  | P < 500kpa | ALL | 1level | 1level | 1level | 1level | 2level | 2level | 3level |
|  | t < 30°C (Reference) | 1500kpa ≤ P | ALL | 1level | 2level | 2level | 3level | 3level | 3level | 3level |
|  |  | 1000kpa ≤ P < 1500kpa | V < 45 | 1level | 1level | 2level | 2level | 3level | 3level | 3level |
|  |  |  | 45 ≤ V < 80 | 1level | 1level | 1level | 2level | 2level | 3level | 3level |
|  |  |  | 80 ≤ V | 1level | 1level | 1level | 1level | 2level | 2level | 3level |
|  |  | 500kpa ≤ P < 1000kpa | V < 45 | 1level | 1level | 1level | 2level | 2level | 3level | 3level |
|  |  |  | 45 ≤ V < 80 | 1level | 1level | 1level | 1level | 2level | 2level | 3level |
|  |  |  | 80 ≤ V | 1level | 1level | 1level | 1level | 1level | 2level | 3level |
|  |  | P < 500kpa | ALL | 1level | 1level | 1level | 1level | 1level | 2level | 3level |
| Off | 30°C (Reference) ≤ t |  | V < 45 | 1level | 1level | 1level | 1level | 2level | 2level | 3level |
|  |  |  | 45 ≤ V < 80 | 1level | 1level | 1level | 1level | 2level | 2level | 3level |
|  |  |  | 80 ≤ V | 1level | 1level | 1level | 1level | 2level | 2level | 3level |
|  | t < 30°C (Reference) |  | V < 45 | 1level | 1level | 1level | 1level | 1level | 2level | 3level |
|  |  |  | 45 ≤ V < 80 | 1level | 1level | 1level | 1level | 1level | 2level | 3level |
|  |  |  | 80 ≤ V | 1level | 1level | 1level | 1level | 1level | 2level | 3level |

ACTIVE AIR FLAP AND CONTROL METHOD THEREOF

CROSS REFERENCE TO RELATED APPLICATION

The present application claims priority to Korean Patent Application No. 10-2019-0034208, filed Mar. 26, 2019 in the Korean Intellectual Property Office, the entire contents of which is incorporated herein for all purposes by this reference.

TECHNICAL FIELD

The present disclosure relates to an active air flap and a control method thereof, in which the operation of the air flap is selectively controlled by section according to the driving conditions of a vehicle while increasing a flow rate of air introduced in a radiator module, thereby contributing to improvement in cooling performance and fuel economy.

BACKGROUND

Recently, as exhaust gas environment regulations have been strengthened, various technologies for improving exhaust gas purifying capability have been developed.

Normally, in order to improve the exhaust gas purifying capability, it is necessary to optimize a catalyst to an activation temperature, and the temperature of the exhaust gas is cooled by using cooling water in order to adjust the catalyst to the activation temperature.

However, since the temperature of the cooling water rises rapidly due to high-temperature exhaust heat, in some severe driving modes, there is a limit to stably controlling the cooling water temperature only by the existing cooling system.

When the hardware specifications of the radiator module and fan motor are improved, it is possible to increase the cooling capacity, but there is a problem that the capacity of these components may not be increased indefinitely due to the complex engine room layout and cost and weight increase.

An opening provided at the front of a bumper is configured such that a portion (effective cooling portion) where air can be directly supplied to the radiator module disposed behind the bumper is opened, and the remaining portion is blocked.

When the area of the opening is increased, a flow rate of air introduced through the opening is increased, and the heat dissipation rate of the radiator is increased, thereby improving cooling performance.

However, as the area of the opening is increased, an aerodynamic coefficient (Cd) value becomes high and driving resistance becomes large, so the area of the opening cannot be increased indefinitely.

Therefore, there is a demand for a way of improving fuel economy and cooling performance without increasing the capacity and size of the components constituting a cooling system.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an active air flap and a control method thereof, in which the operation of the air flap is selectively controlled by section according to the driving conditions of a vehicle while increasing a flow rate of air introduced in a radiator, thereby contributing to improvement in cooling performance and fuel economy.

In order to achieve the above object, according to an exemplary embodiment of the present disclosure, an active air flap includes: a first air flap disposed between a ventilation opening of a bumper and a radiator, and openably disposed in a first section facing the radiator; a second air flap disposed between the ventilation opening of the bumper and the radiator, and openably disposed in a second section bordering the first section facing the radiator; and an air guide configured to guide air introduced in the ventilation opening toward the first air flap and the second air flap.

The first air flap may be provided to correspond to a lateral width of the radiator module; and the second air flap may be provided at a position following a lateral outermost edge of the first air flap.

The ventilation opening may include: a first opening portion provided at a position facing the first air flap; and a second opening portion provided at a position facing the second air flap.

The second opening portion may extend in a lateral direction of the first opening portion.

The air guide may be configured such that an inlet at a first end thereof is provided to face the ventilation opening, an outlet at a second end thereof is provided to face the radiator module, and an opening cross-sectional area thereof is increased from the inlet toward the outlet.

An edge of the inlet may be formed to correspond to an edge of the ventilation opening; and a lateral width of the outlet may be larger than a lateral width of the radiator module.

The first air flap may be provided in a central opening portion of the air guide; the second air flap may be provided in a side opening portion of the air guide; and a partition wall may be provided between the central opening portion and the side opening portion of the air guide to partition a section where the first air flap is provided and a section where the second air flap is provided.

A rotating shaft of the first air flap may be rotatably mounted through the central opening portion of the air guide in a vertical direction; the first air flap may be provided in plural along a right and left longitudinal direction of the central opening portion; the rotating shafts of the first air flaps may be connected together by a link; and a first motor actuator may be provided to provide torque to the rotating shaft of the first air flap.

A rotating shaft of the second air flap may be rotatably mounted through the side opening portion of the air guide in the vertical direction; the second air flap may be provided in plural along a right and left longitudinal direction of the side opening portion; the rotating shafts of the second air flaps may be connected together by a link; and a second motor actuator may be provided to provide torque to the rotating shaft of the second air flap.

A first side of a rubber may be coupled to each of first sides of the first air flap and the second air flap along a longitudinal direction; a second side of the rubber may be provided with a rubber stepped portion along the longitudinal direction; and each of second sides of the first air flap and the second air flap may be provided along the longitudinal direction with a flap stepped portion having a shape corresponding to the rubber stepped portion such that the flap stepped portion and the neighboring rubber stepped portion are mutually matched.

The active air flap may further include a controller configured to receive vehicle speed, an outside temperature, a refrigerant pressure, and a cooling water temperature, and control opening and closing operation of the first air flap and the second air flap based on at least one factor of the vehicle speed, the outside temperature, the refrigerant pressure, and the cooling water temperature.

When an air conditioner is operated, the controller selectively may control the opening and closing operation of the first air flap and the second air flap based on relationship between the vehicle speed, the outside temperature, the refrigerant pressure, and the cooling water temperature; and when the air conditioner is not operated, the controller may selectively control the opening and closing operation of the first air flap and the second air flap based on relationship between the vehicle speed, the outside temperature, and the cooling water temperature.

The controller may control the opening and closing operation of the first air flap and the second air flap by selecting one of a low cooling mode controlling the first air flap and the second air flap to be closed, a medium cooling mode controlling the first air flap to be opened and the second air flap to be closed, and a high cooling mode controlling the first air flap and the second air flap to be opened.

According to another exemplary embodiment of the present disclosure, a method of controlling an active air flap including: a first air flap disposed between a ventilation opening of a bumper and a radiator, and openably disposed in a first section facing the radiator; a second air flap disposed between the ventilation opening of the bumper and the radiator, and openably disposed in a second section bordering the first section facing the radiator; and an air guide configured to guide air introduced in the ventilation opening toward the first air flap and the second air flap, wherein the method includes: receiving, by a controller, a vehicle speed, an outside temperature, a refrigerant pressure, and a cooling water temperature; and controlling, by the controller, an opening and closing operation of the first air flap and the second air flap based on at least one of the vehicle speed, the outside temperature, the refrigerant pressure, or the cooling water temperature.

The present disclosure is advantageous in that the ventilation opening of the bumper is partitioned, and the air flaps provided in each of the partitioned sections are selectively controlled to be opened or closed according to the driving conditions of the vehicle, and thus, when a large cooling load is required, a large amount of air is supplied to the radiator module to improve the cooling performance, and when a small cooling load is required, the ventilation area of the ventilation opening is minimized to reduce the aerodynamic coefficient, thereby contributing to improvement in fuel economy.

BRIEF DESCRIPTION OF THE DRAWINGS

The above and other objects, features and other advantages of the present disclosure will be more clearly understood from the following detailed description when taken in conjunction with the accompanying drawings, in which:

FIG. 8 is a view exemplarily showing a cooling mode table determined according to an operating condition of a vehicle in an exemplary embodiment of the present disclosure.

DETAILED DESCRIPTION OF THE DISCLOSURE

Hereinbelow, an exemplary embodiment of the present disclosure will be described in detail with reference to the accompanying drawings.

An active air flap according to an exemplary embodiment of the present disclosure roughly includes a first air flap 10, a second air flap 20, and an air guide 30.

Figure 1:
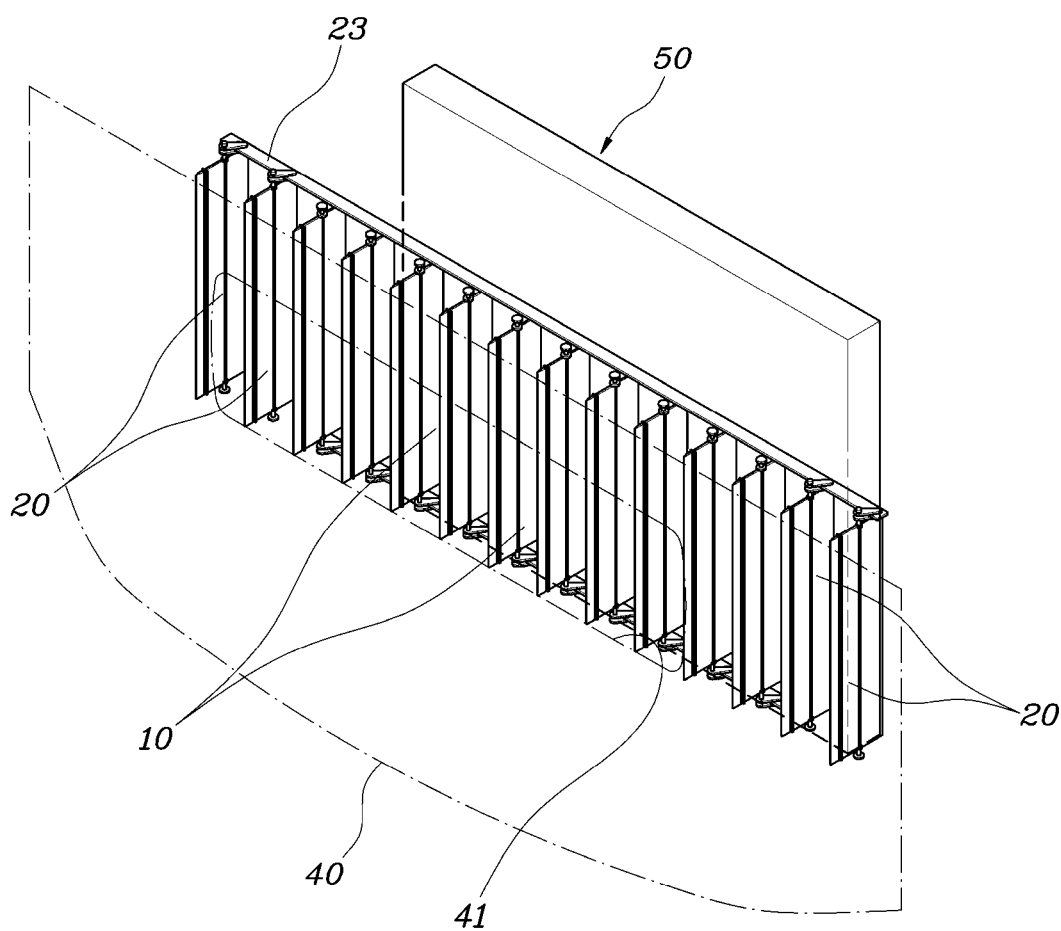
FIG. 1 is a view showing a configuration of an air flap provided between a bumper and a radiator module according to an exemplary embodiment of the present disclosure.
Figure 2:
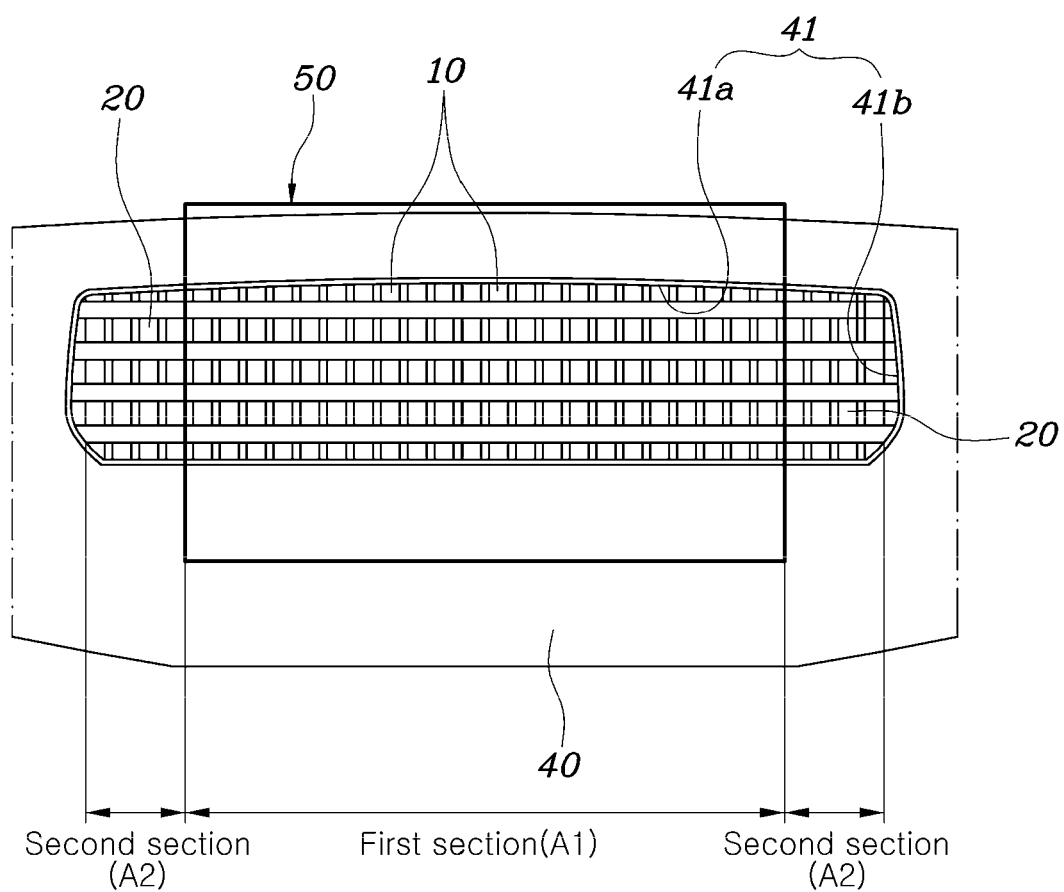
FIG. 2 is a view showing a positional relationship between the radiator module and a ventilation opening according to an exemplary embodiment of the present disclosure.

With reference to FIGS. 1 and 2, the active air flap includes: the first air flap 10 provided between a ventilation opening 41 of a bumper 40 and a radiator module 50, and openably provided in a first section A1 facing the radiator module 50; the second air flap 20 provided between the ventilation opening 41 of the bumper 40 and the radiator module 50, and openably provided in a second section A2 bordering the first section A1 facing the radiator module 50; and the air guide 30 configured to guide air introduced in the ventilation opening 41 toward the first air flap 10 and the second air flap 20.

To be specific, the first air flap 10 is disposed at a position straightly facing the radiator module 50 in the front-rear direction, wherein when outside air is introduced through the ventilation opening 41 in the state where the first air flap 10 is opened, the outside air flows toward the first air flap 10 through the air guide 30, so that a large amount of air can be supplied at the front of the radiator module 50.

Further, the second air flap 20 is disposed at a position not straightly facing the radiator module 50 in the front-rear direction but bordering the first section A1 straightly facing the radiator module 50 in the front-rear direction, wherein when outside air is introduced through the ventilation opening 41 in the state where the second air flap 20 is opened, the outside air flows toward the second air flap 20 through the air guide 30, so that it is possible to additionally supply air around the radiator module 50.

In other words, when opening both the first air flap 10 and the second air flap 20, not only outside air is supplied at a position facing the radiator module 50, but also outside air is additionally supplied to the radiator module 50 at a position not facing the radiator module 50, whereby it is possible to maximize cooling performance by increasing a flow rate of air supplied to the radiator module 50.

Further, when closing only the second air flap 20, driving resistance is reduced while achieving constant cooling performance, thereby reducing fuel consumption. When closing both the first air flap 10 and the second air flap 20, the aerodynamic coefficient is greatly reduced, whereby the fuel economy can be greatly improved.

Thus, the present disclosure is configured such that opening and closing operation of the first air flap 10 and the second air flap 20 is selectively performed, so the cooling performance according to the driving conditions of the vehicle can be improved and the fuel economy can be improved.

In addition, in the present disclosure, the first air flap 10 may be provided to correspond to a lateral width of the radiator module 50, and the second air flap 20 may be provided at a position following a lateral outermost edge of the first air flap 10.

In other words, the air passing through the first air flap 10 is supplied to the entire front surface of the radiator module 50, so the flow rate of air supplied to the radiator module 50 is increased, and also the air passing through the second air flap 20 is additionally supplied to the sides of the radiator module 50, whereby the flow rate of air supplied to the radiator module 50 can be further increased.

In addition, in the present disclosure, the ventilation opening 41 includes: a first opening portion 41a provided at a position facing the first air flap 10; and a second opening portion 41b provided at a position facing the second air flap 20.

Further, the second opening portion 41b may extend in a lateral direction of the first opening portion 41a.

In other words, the air introduced through the first opening portion 41a flows toward the first air flap 10, and the air introduced through the second opening portion 41b flows toward the second air flap 20, so that the flow rate of air supplied through the second air flap 20 can be stably secured as well as the flow rate of air supplied through the first air flap 10, thereby increasing the air flow rate.

Figure 3:
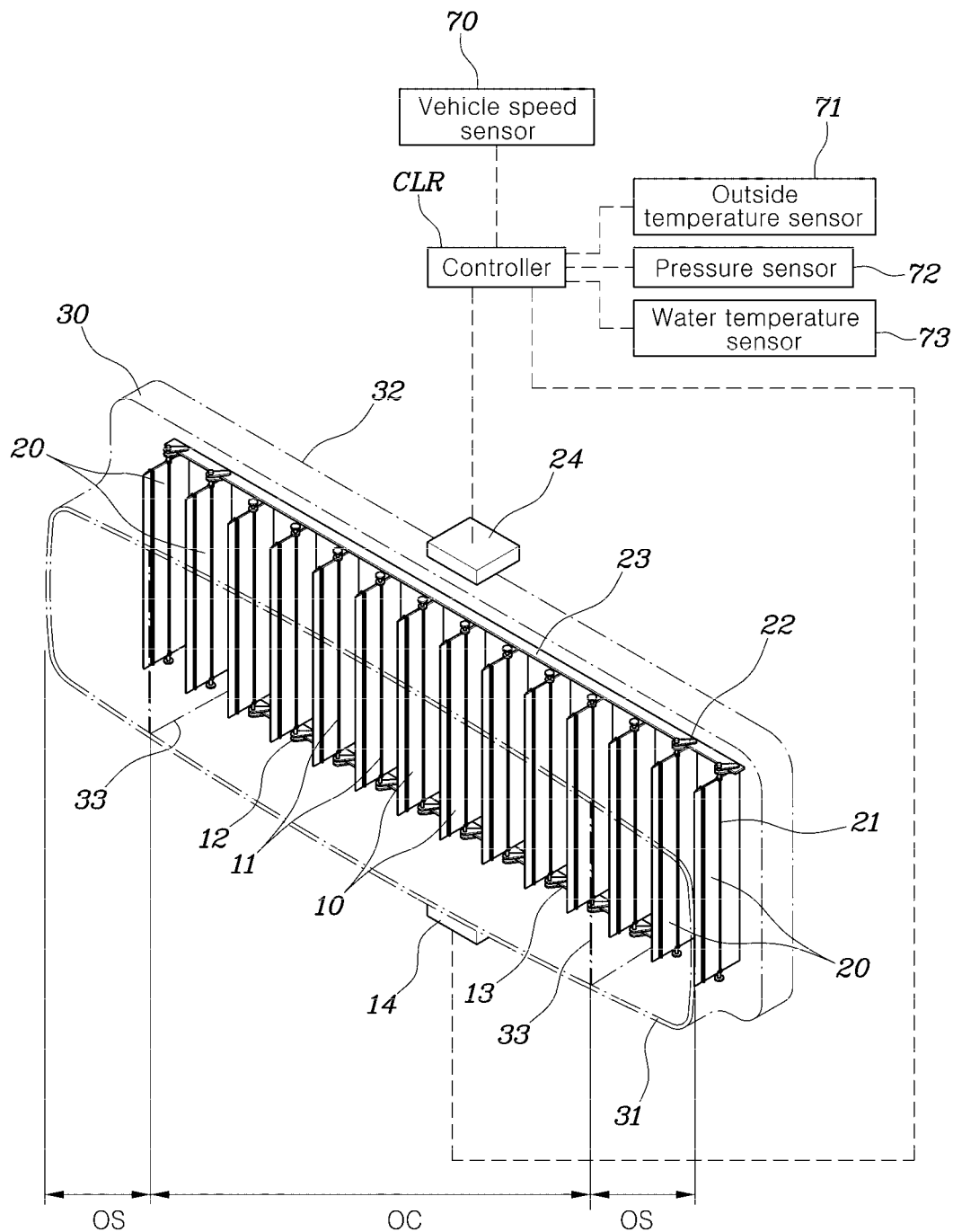
FIG. 3 is a view showing a state where a first air flap and a second air flap are provided in an air guide according to an exemplary embodiment of the present disclosure viewed from a bumper side.
Figure 4:
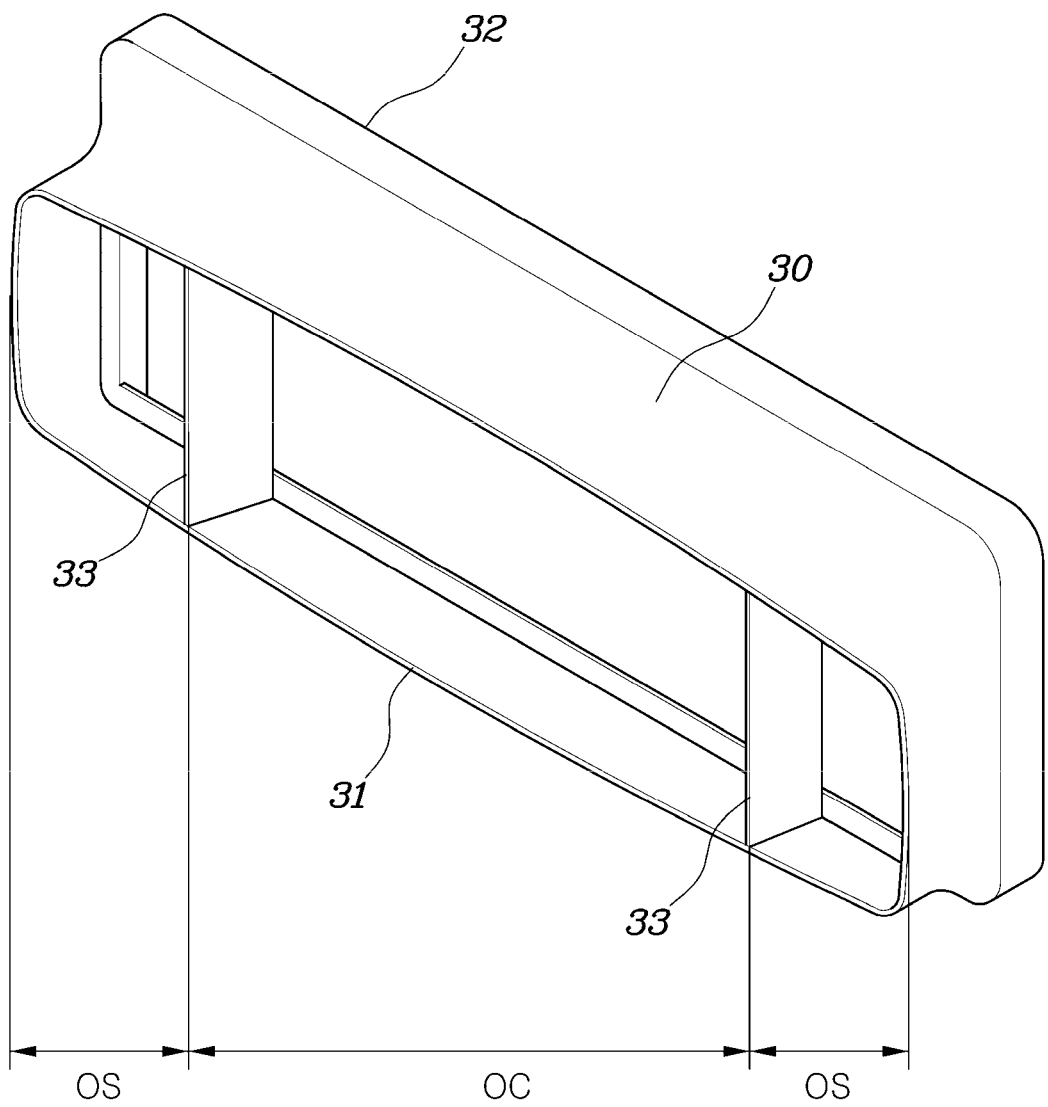
FIG. 4 is a view showing a shape of the air guide according to an exemplary embodiment of the present disclosure.

With reference to FIGS. 3 and 4, the air guide 30 may be configured such that an inlet 31 at a first end thereof is provided to face the ventilation opening 41, and an outlet 32 at a second end thereof is provided to face the radiator module 50, and an opening cross-sectional area thereof is increased from the inlet 31 toward the outlet 32 in at least one direction of up-down and right-left directions.

In other words, the outside air introduced through the ventilation opening 41 of the bumper 40 is introduced through the inlet 31 of the air guide 30, and the introduced air is introduced directly in the radiator module 50 through the outlet 32. In addition, since the outlet 32 is formed in an expanded shape as compared with the inlet 31, the area to which the air is supplied to the radiator module 50 is further increased, thereby further improving the cooling performance through the radiator module 50.

Further, an edge of the inlet 31 may be formed to correspond to an edge of the ventilation opening 41, and a lateral width of the outlet 32 may be formed to be larger than a lateral width of the radiator module 50.

In other words, the ventilation opening 41 and the inlet are formed to have the same shape, so that the air introduced through the ventilation opening 41 can be supplied to the radiator module 50 without leaking out of the inlet 31, and thus, the amount of air supplied to the radiator module 50 is prevented from being reduced.

Further, since the width of the outlet 32 is formed to be larger than that of the radiator module 50, some of the air supplied through the outlet 32 is additionally supplied to the sides of the radiator module 50, so the flow rate of air supplied to the radiator module 50 can be further increased.

As shown in FIGS. 3 and 4, in the present disclosure, the first air flap 10 is provided in a central opening portion OC of the air guide 30, and the second air flap 20 is provided in a side opening portion OS of the air guide 30.

Further, a partition wall 33 is provided between the central opening portion OC and the side opening portion OS of the air guide 30, so that a section where the first air flap 10 is provided and a section where the second air flap 20 is provided can be partitioned.

For example, the first air flap 10 is provided in the central opening portion OC of the air guide 30, which is a part facing the radiator module 50, and the second air flap 20 is provided in the side opening portion OS, which is a part positioned at each of opposite sides of the central opening portion OC of the air guide 30 and does not face the radiator module 50.

Further, the partition wall 33 is provided in the air guide 30 in the longitudinal direction to partition a section where the first air flap 10 is provided and a section where the second air flap 20 is provided.

Figure 5:
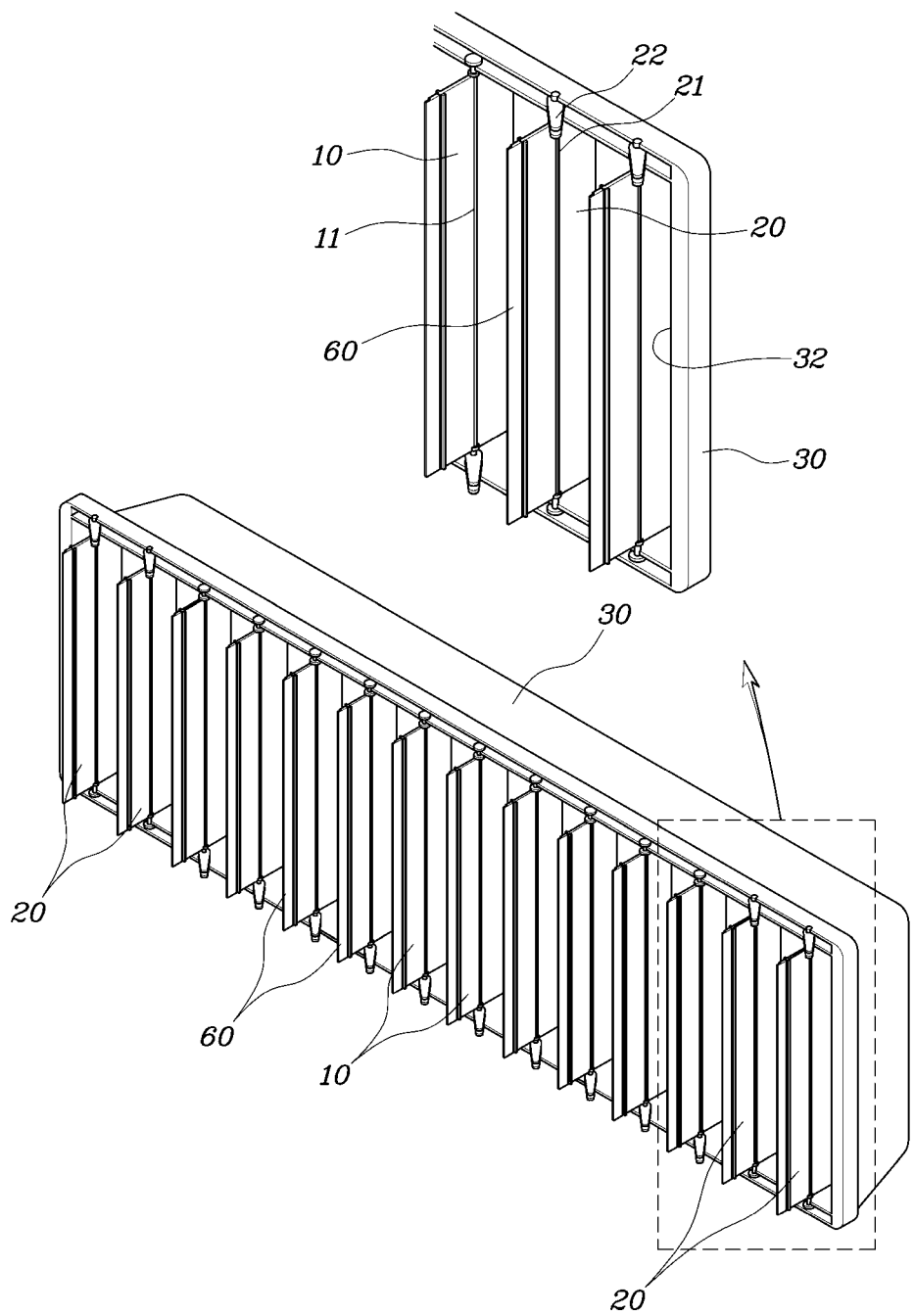
FIG. 5 is a view showing a state where the first air flap and the second air flap are provided in the air guide according to an exemplary embodiment of the present disclosure viewed from a radiator module side.
Figure 6:
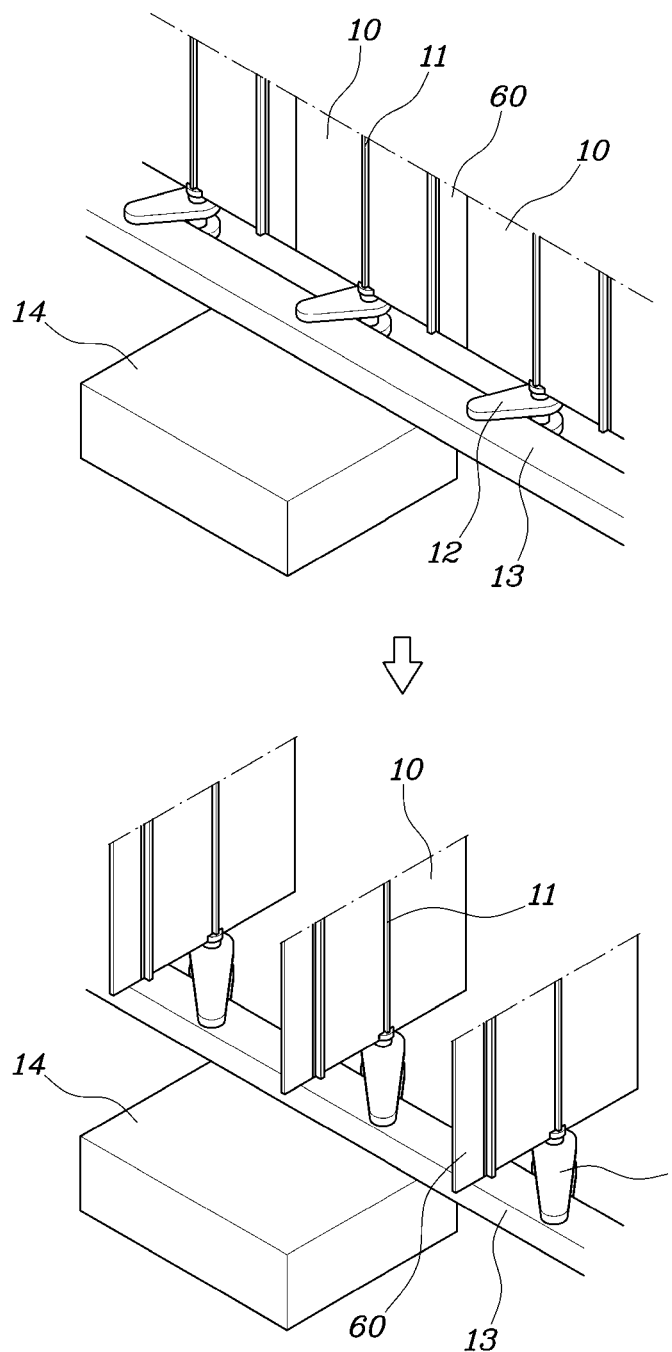
FIG. 6 is a view showing a structure for operating the first air flap according to an exemplary embodiment of the present disclosure and an operating relationship.

With reference to FIGS. 5 and 6, to be specific to the configuration in which the first air flap 10 is provided, a rotating shaft 11 of the first air flap 10 is rotatably mounted through the central opening portion OC of the air guide 30 in a vertical direction. In other words, an upper end of the rotating shaft 11 of the first air flap 10 is assembled with a groove formed in the upper portion of the outlet 32, and a lower end of the rotating shaft 11 is assembled with a groove formed in the lower portion of the outlet 32 to be rotatable.

Further, the first air flap 10 is provided in plural within the central opening portion OC along a right and left longitudinal direction. In other words, the rotating shaft 11 of the first air flap 10 is provided side by side along the central opening portion OC so that spaces between the first air flaps 10 can be opened or closed in response to the rotation operation of the first air flaps 10.

Further, the rotating shafts 11 of the first air flaps 10 may be connected together by a link 13, and a first motor actuator 14 may be provided to provide torque to the rotating shaft 11 of the first air flap 10.

For example, a first end of a loader 12 protruding in the radial direction of the rotating shaft 11 may be coupled to the rotating shaft 11, and the link 13 may be connected to a second end of the loader 12.

Further, the first motor actuator 14 is configured to provide torque to one rotating shaft 11 of the rotating shafts 11. In other words, when torque is provided to the loader 12 coupled to any one rotating shaft 11 through the first motor actuator 14, the corresponding rotating shaft 11 is rotated in response to the rotation of the loader 12, and at the same time, all of the rotating shafts 11 are simultaneously rotated through the link 13, whereby all of the first air flaps 10 can be simultaneously rotated.

In addition, to be specific to the configuration in which the second air flap 20 is provided, a rotating shaft 21 of the second air flap 20 is rotatably mounted through the side opening portion OS of the air guide 30 in the vertical direction. In other words, an upper end of the rotating shaft 21 of the second air flap 20 is assembled with a groove formed in the upper portion of the outlet 32, and a lower end of the rotating shaft 21 is assembled with a groove formed in the lower portion of the outlet 32 to be rotatable.

Further, the second air flap 20 is provided in plural within the side opening portion OS along the right and left longitudinal direction. In other words, the rotating shaft 21 of the second air flap 20 is provided side by side along the side opening portion OS so that spaces between the second air flaps 20 can be opened or closed in response to the rotation operation of the second air flaps 20.

Further, the rotating shafts 21 of the second air flaps 20 may be connected together by a link 23, and a second motor actuator 24 may be provided to provide torque to the rotating shaft 21 of the second air flap 20.

For example, a first end of a loader 22 protruding in the radial direction of the rotating shaft 21 may be coupled to the rotating shaft 21, and the link 23 may be connected to a second end of the loader 22.

Further, the second motor actuator 24 is configured to provide torque to one rotating shaft 21 of the rotating shafts 21. In other words, when torque is provided to the loader 22 coupled to any one rotating shaft 21 through the second motor actuator 24, the corresponding rotating shaft 21 is rotated in response to the rotation of the loader 22, and at the same time, all of the rotating shafts 21 are simultaneously rotated through the link 23, whereby all of the second air flaps 20 can be simultaneously rotated.

Figure 7:
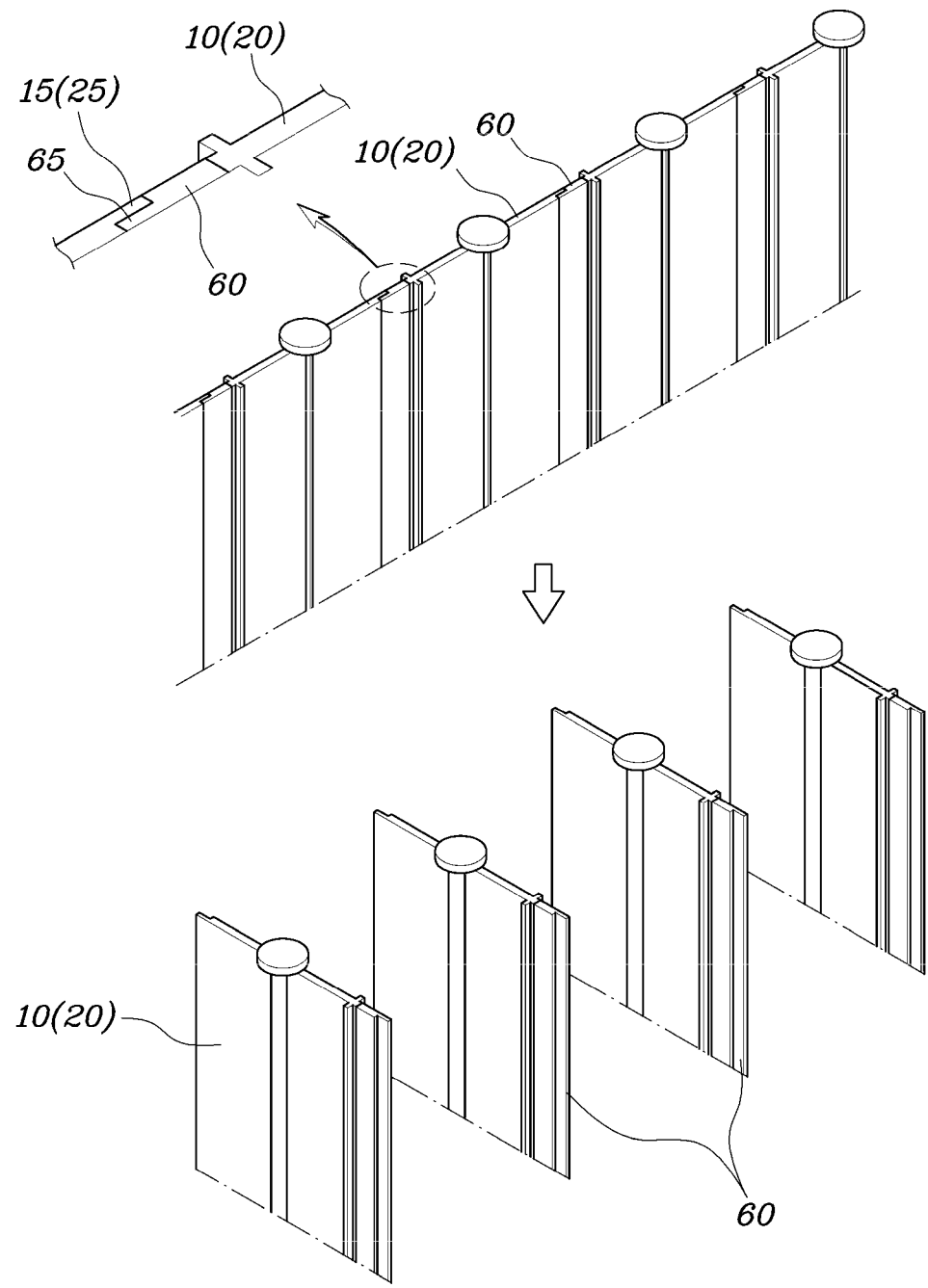
FIG. 7 is a view showing a sealing structure between a rubber and the air flap according to an exemplary embodiment of the present disclosure.

In addition, as shown in FIG. 7, a first side of a rubber 60 is coupled to each of first sides of the first air flap 10 and the second air flap 20 along a vertical longitudinal direction, and a second side of the rubber 60 is provided with a rubber stepped portion 65 formed in a stepped shape along the vertical longitudinal direction.

Further, second sides of the first air flap 10 and the second air flap 20 are provided along the vertical longitudinal direction with flap stepped portions 15 and 25 having a shape corresponding to the rubber stepped portion 65, respectively, so that the flap stepped portion 15, 25 and the neighboring rubber stepped portion 65 can be mutually matched.

In other words, when closing both the first air flap 10 and the second air flap 20, the rubber stepped portion 65 provided at the rubber 60 is matched with the flap stepped portion 15, 25 provided at the neighboring air flap, thereby sealing the air flaps, and thus, when closing the air flaps, it is possible to prevent air from entering between the air flaps.

Both the first air flap 10 and the second air flap 20 have a vertical length corresponding to or a little shorter than the vertical length of the outlet 32 of the air guide 30, whereby it is possible to minimize introduction of the air in the air guide 30 to the radiator module 50 when closing the air flaps.

As shown in FIG. 3, the present disclosure further includes a controller CLR configured to receive vehicle speed, an outside temperature, a refrigerant pressure, and a cooling water temperature, and control opening and closing operation of the first air flap 10 and the second air flap 20 based on at least one factor of the vehicle speed, the outside temperature, the refrigerant pressure, and the cooling water temperature.

Herein, in order to obtain the factors, sensing values may be detected through sensors such as a vehicle speed sensor 70, an outside temperature sensor 71, a pressure sensor 72, a water temperature sensor 73, and the like provided in a vehicle, and the detected sensing values are input to the controller CLR to secure each factor.

Further, the controller according to an exemplary embodiment of the present disclosure may be implemented using a non-volatile memory (not shown) configured to store an algorithm configured to control the operations of the various components of the vehicle or data relating to a software instruction for playing the algorithm, and a processor (not shown) configured to perform the operations described below using the data stored in the memory. Here, the memory and the processor may be implemented as separate chips. Alternatively, the memory and the processor may be implemented as a single chip integrated with each other. The processor may take the form of one or more processors.

Thus, when an air conditioner is operated, the controller CLR can selectively control the opening and closing operation of the first air flap 10 and the second air flap 20 based on relationship between the vehicle speed, the outside temperature, the refrigerant pressure, and the cooling water temperature.

Further, when the air conditioner is not operated, the controller CLR can selectively control the opening and closing operation of the first air flap 10 and the second air flap 20 based on relationship between the vehicle speed, the outside temperature, and the cooling water temperature.

In addition, the opening and closing control of the first air flap 10 and the second air flap 20 may be determined by a table shown in FIG. 8, wherein there are a low cooling mode requiring weak cooling by the cooling water, a medium cooling mode requiring intermediate cooling by the cooling water, and a high cooling mode requiring strong cooling by the cooling water, and it is possible to selectively control the opening and closing operation of the first air flap 10 and the second air flap 20 according to the different cooling modes.

For example, in the low cooling mode, both the first air flap 10 and the second air flap 20 are controlled to be closed, and in the medium cooling mode, the first air flap 10 is controlled to be opened, and the second air flap 20 is controlled to be closed.

Further, in the high cooling mode, both the first air flap 10 and the second air flap 20 are controlled to be opened.

In other words, in terms of vehicle speed, as the vehicle speed is increased, stronger cooling action is required, and in terms of outside temperature, as the outside temperature is increased, stronger cooling action is required.

Further, in terms of cooling water temperature, as the cooling water temperature is increased, stronger cooling action is required, and in terms of refrigerant pressure, as the refrigerant pressure is increased, stronger cooling action is required.

According to the above configuration, in the present disclosure, as a method of controlling the active air flap, the controller CLR receives the vehicle speed, the outside temperature, the refrigerant pressure, and the cooling water temperature, and controls the opening and closing operation of the first air flap 10 and the second air flap 20 based on at least one factor of the vehicle speed, the outside temperature, the refrigerant pressure, and the cooling water temperature.

Thus, in the present disclosure, the opening and closing operation of the first air flap 10 and the second air flap 20 is selectively performed according to the driving conditions of the vehicle, thereby improving cooling performance and fuel economy.

In other words, the ventilation opening 41 of the bumper 40 is partitioned based on the radiator module 50 while increasing the area of the ventilation opening 41, and each of the partitioned sections is provided with the air flap, so the air flap is selectively controlled to be opened or closed according to the driving conditions of the vehicle. Thus, when a large cooling load is required, a large amount of air is supplied to the radiator module 50 to improve the cooling performance, and when a small cooling load is required, the ventilation area of the ventilation opening 41 is minimized to reduce the aerodynamic coefficient, thereby contributing to improvement in fuel economy.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An active air flap comprising:
a first air flap disposed between a ventilation opening of a bumper and a radiator, and openably disposed in a first section facing the radiator;
a second air flap disposed between the ventilation opening of the bumper and the radiator, and openably disposed in a second section bordering the first section facing the radiator;
an air guide configured to guide air introduced in the ventilation opening toward the first air flap and the second air flap; and
a controller configured to:
receive a vehicle speed, an outside temperature, a refrigerant pressure, and a cooling water temperature, and
control an opening and closing operation of the first air flap and the second air flap based on at least one of the vehicle speed, the outside temperature, the refrigerant pressure, or the cooling water temperature,
wherein, when an air conditioner is operated, the controller selectively controls the opening and closing operation of the first air flap and the second air flap based on a relationship between the vehicle speed, the outside temperature, the refrigerant pressure, and the cooling water temperature, and
wherein, when the air conditioner is not operated, the controller selectively controls the opening and closing operation of the first air flap and the second air flap based on a relationship between the vehicle speed, the outside temperature, and the cooling water temperature.

2. The active air flap of claim 1, wherein the first air flap is disposed to correspond to a lateral width of a radiator module, and
wherein the second air flap is disposed at a position following a lateral outermost edge of the first air flap.

3. The active air flap of claim 1, wherein the ventilation opening includes:
a first opening portion disposed at a position facing the first air flap; and
a second opening portion disposed at a position facing the second air flap.

4. The active air flap of claim 1, wherein the second opening portion extends in a lateral direction of the first opening portion.

5. The active air flap of claim 1, wherein the air guide includes:
an inlet at a first end of the air guide facing the ventilation opening;
an outlet at a second end of the air guide facing a radiator module; and
an opening cross-sectional area increasing from the inlet toward the outlet.

6. The active air flap of claim 5, wherein an edge of the inlet corresponds to an edge of the ventilation opening, and
wherein a lateral width of the outlet is larger than a lateral width of the radiator module.

7. The active air flap of claim 1, wherein the first air flap is disposed in a central opening portion of the air guide,
wherein the second air flap is disposed in a side opening portion of the air guide, and
wherein a partition wall is disposed between the central opening portion and the side opening portion of the air guide to partition a section where the first air flap is disposed and a section where the second air flap is disposed.

8. The active air flap of claim 7, wherein a rotating shaft of the first air flap is rotatably mounted through the central opening portion of the air guide in a vertical direction,
wherein the first air flap is provided in plural along a right and left longitudinal direction of the central opening portion,
wherein the rotating shaft of each of the plurality of first air flaps is connected to each other by a link, and
wherein the active air flap further comprises a first motor actuator providing torque to the rotating shaft of the first air flap.

9. The active air flap of claim 7, wherein a rotating shaft of the second air flap is rotatably mounted through the side opening portion of the air guide in the vertical direction,
wherein the second air flap is provided in plural along a right and left longitudinal direction of the side opening portion,
wherein the rotating shaft of each of the plurality of second air flaps is connected to each other by a link, and
wherein the active air flap further comprises a second motor actuator providing torque to the rotating shaft of the second air flap.

10. The active air flap of claim 8, further comprising a rubber,
wherein a first side of the rubber is coupled to each of first sides of the first air flap and the second air flap along a longitudinal direction,
wherein a second side of the rubber has a rubber stepped portion along the longitudinal direction, and
wherein each of second sides of the first air flap and the second air flap is disposed along the longitudinal direction with a flap stepped portion having a shape corresponding to the rubber stepped portion such that the flap stepped portion and an adjacent rubber stepped portion are mutually matched.

11. The active air flap of claim 9, further comprising a rubber,
wherein a first side of the rubber is coupled to each of first sides of the first air flap and the second air flap along a longitudinal direction,
wherein a second side of the rubber includes a rubber stepped portion along the longitudinal direction, and
wherein each of second sides of the first air flap and the second air flap is disposed along the longitudinal direction with a flap stepped portion having a shape corresponding to the rubber stepped portion such that the flap stepped portion and an adjacent rubber stepped portion are mutually matched.

12. A control method of an active air flap,
wherein the active air flap comprises:
a first air flap disposed between a ventilation opening of a bumper and a radiator, and openably disposed in a first section facing the radiator;
a second air flap disposed between the ventilation opening of the bumper and the radiator, and openably disposed in a second section bordering the first section facing the radiator; and an air guide configured to guide air introduced in the ventilation opening toward the first air flap and the second air flap, wherein the control method comprising:

receiving, by a controller, a vehicle speed, an outside temperature, a refrigerant pressure, and a cooling water temperature, and controlling, by the controller, an opening and closing operation of the first air flap and the second air flap based on at least one of the vehicle speed, the outside temperature, the refrigerant pressure, or the cooling water temperature, wherein, when an air conditioner is operated, the controller selectively controls the opening and closing operation of the first air flap and the second air flap based on a relationship between the vehicle speed, the outside temperature, the refrigerant pressure, and the cooling water temperature, and wherein, when the air conditioner is not operated, the controller selectively controls the opening and closing operation of the first air flap and the second air flap based on a relationship between the vehicle speed, the outside temperature, and the cooling water temperature.

13. A control method of an active air flap, wherein the active air flap comprises:

a first air flap disposed between a ventilation opening of a bumper and a radiator, and openably disposed in a first section facing the radiator;

a second air flap disposed between the ventilation opening of the bumper and the radiator, and openably disposed in a second section bordering the first section facing the radiator; and an air guide configured to guide air introduced in the ventilation opening toward the first air flap and the second air flap, wherein the control method comprising:

receiving, by a controller, a vehicle speed, an outside temperature, a refrigerant pressure, and a cooling water temperature; and controlling, by the controller, an opening and closing operation of the first air flap and the second air flap based on at least one of the vehicle speed, the outside temperature, the refrigerant pressure, or the cooling water temperature, and wherein the controller controls the opening and closing operation of the first air flap and the second air flap by selecting one of a low cooling mode controlling the first air flap and the second air flap to be closed, a medium cooling mode controlling the first air flap to be opened and the second air flap to be closed, and a high cooling mode controlling the first air flap and the second air flap to be opened.

* * * * *